Aug. 19, 1930.　　　F. A. SMITH　　　1,773,284
DOUBLE TIRE CARRIER
Filed Nov. 3, 1927　　　4 Sheets-Sheet 1
Fig. 1.
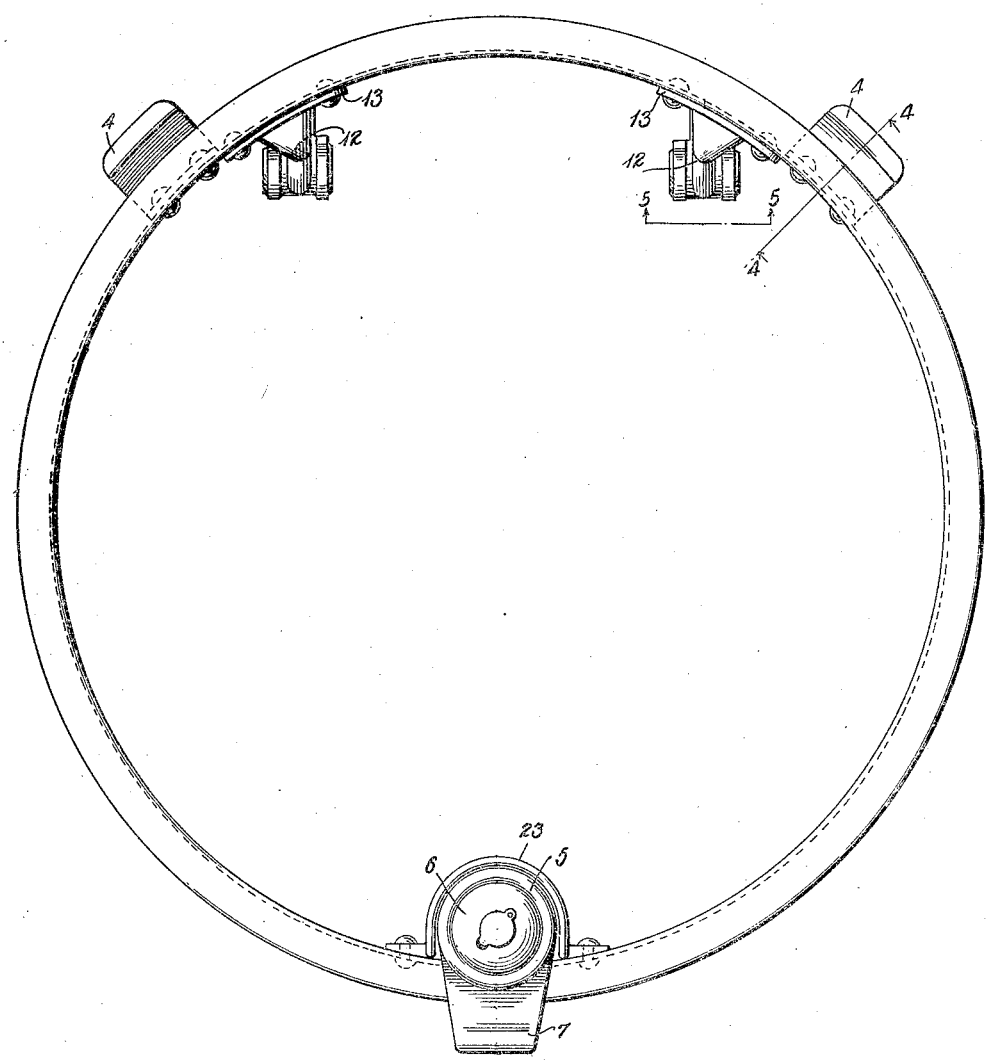
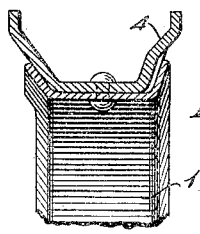
Fig. 4.
INVENTOR.
Frank A. Smith
BY Bacon & Thomas
ATTORNEYS Aug. 19, 1930.  F. A. SMITH  1,773,284
DOUBLE TIRE CARRIER
Filed Nov. 3, 1927   4 Sheets-Sheet 2
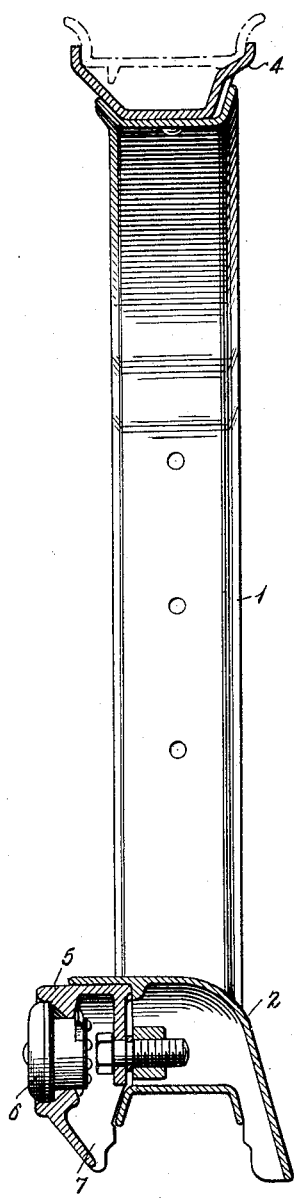
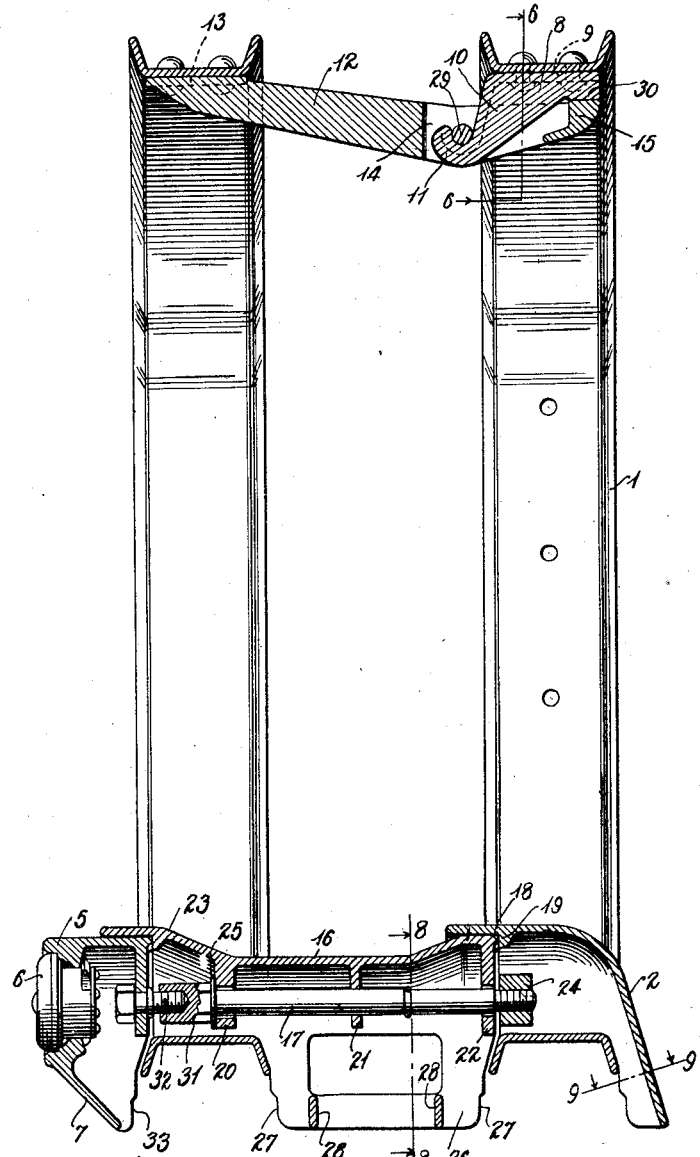
INVENTOR.
Frank A. Smith
BY
ATTORNEYS Aug. 19, 1930.　　　　F. A. SMITH　　　　1,773,284
DOUBLE TIRE CARRIER
Filed Nov. 3, 1927　　　4 Sheets-Sheet 3
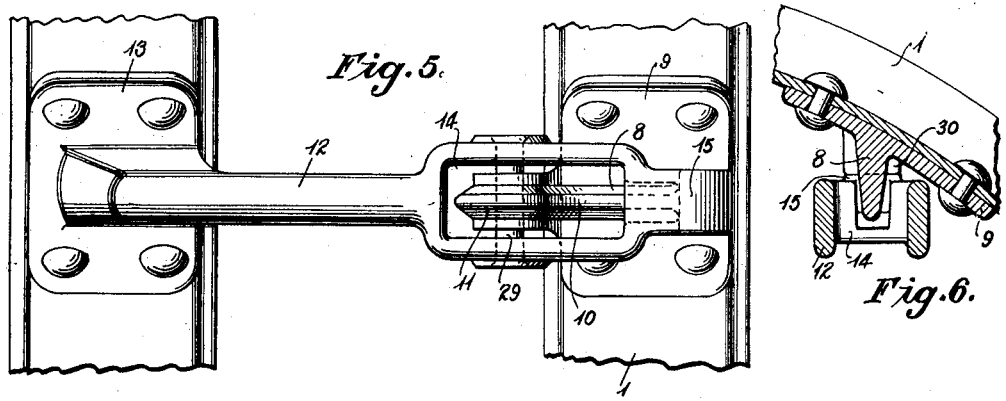
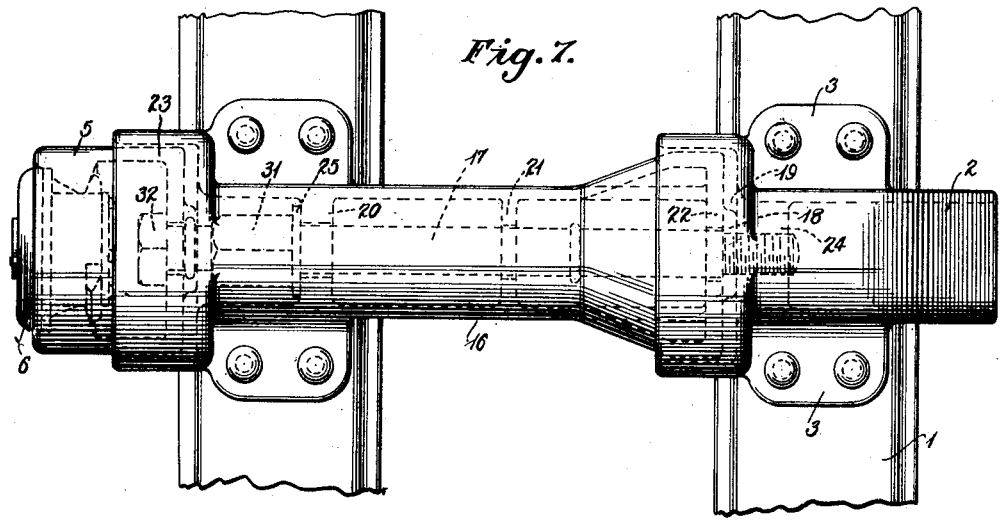
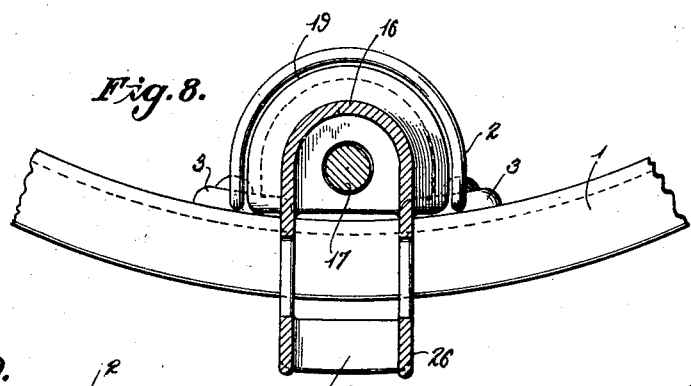
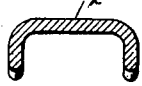
INVENTOR.
Frank A. Smith
BY
ATTORNEYS

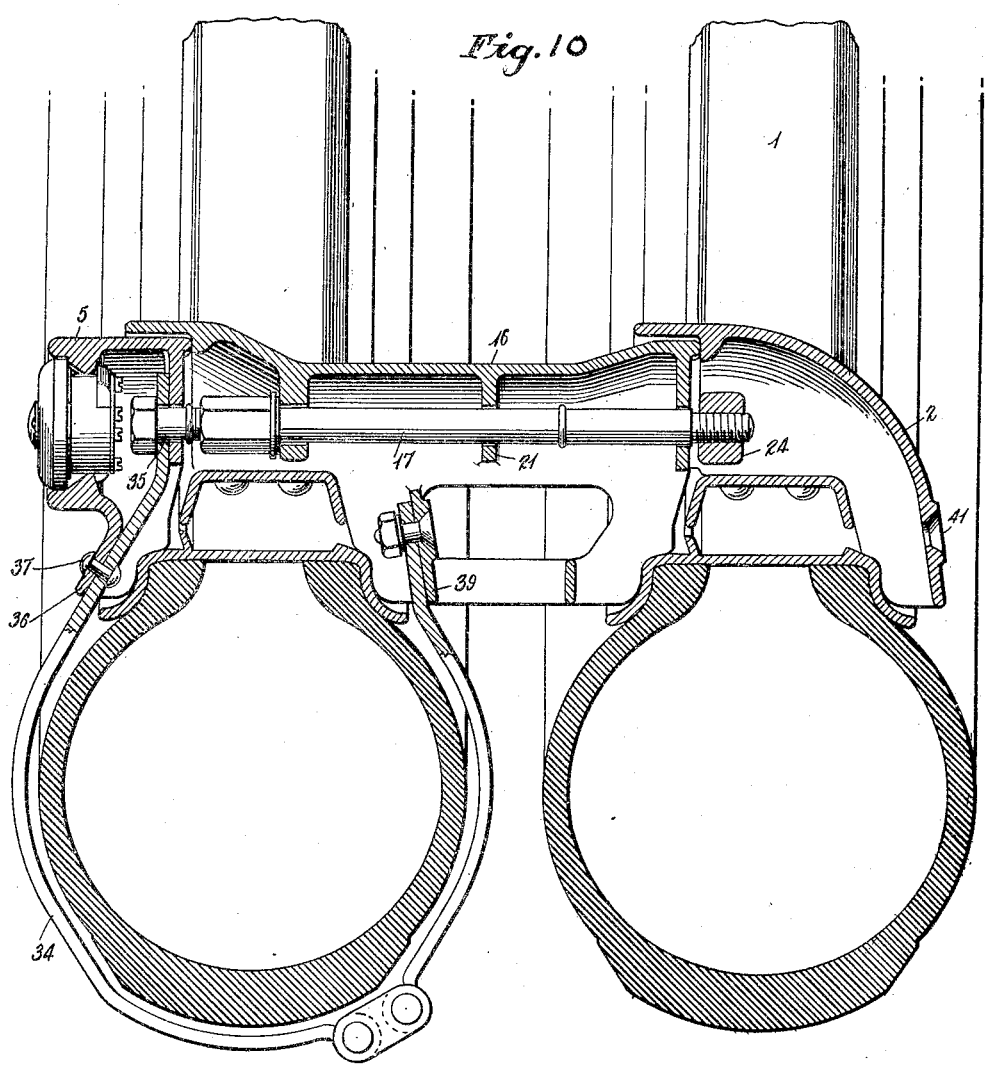

Patented Aug. 19, 1930

1,773,284

UNITED STATES PATENT OFFICE

FREDERICK ARTHUR SMITH, OF INDIANAPOLIS, INDIANA, ASSIGNOR, BY MESNE ASSIGNMENTS, TO DETROIT AND SECURITY TRUST COMPANY, A CORPORATION OF MICHIGAN

DOUBLE TIRE CARRIER

Application filed November 3, 1927. Serial No. 230,832.

This invention relates to double tire carriers for automobiles.

The primary object of the invention is to provide an assembly which may be readily secured to a standard single ring type of tire carrier for the purpose of converting it to a double tire carrier.

Another object of the invention is to provide a common means for securely locking both of the tires and rims on the ring by a single operation.

Another object of the invention is to provide means whereby one of the tires only may be locked on either ring carrier.

Still another object of the invention is to provide brackets adapted to be readily attached to the standard ring type of tire carrier at any service station, affording means by which the auxiliary carrier may be supported by the main carrier with great stability and by means of which the auxiliary carrier may be readily attached or detached.

There are a multiplicity of incidental and subordinate objects of the invention which will be apparent to those skilled in the art from a reading of the following specification in conjunction with the drawings attached hereto and forming a part hereof in which, Fig. 1 is an elevation of the single tire carrier.

Fig. 2 is a view partly in section of the single carrier.

Fig. 3 is a view partly in section of the double tire carrier.

Fig. 4 is a detail of the channel shaped carrier with the rim seats attached thereto.

Fig. 5 is a detail view showing the top bracket attached to the tire carrier.

Fig. 6 is a view on line 6—6 of Fig. 3.

Fig. 7 is a detail of the lower bracket 16 applied to the double tire carrier.

Fig. 8 is a longitudinal sectional detail view taken on line 8—8 of Fig. 3.

Fig. 9 is a detail sectional view of the element 2.

Fig. 10 is a view partly in section of a variant construction.

Referring now particularly to the drawings, wherein like reference characters represent corresponding parts, the reference numeral 1 designates a ring type of tire carrier which in itself constitutes no part of the present invention. This ring is adapted to receive and support a demountable rim and tire carried thereby. The ring comprises a rim clamp 2 attached thereto by lateral ears 3. This ring carrier is provided with rim seats 4 in the upper half of its circumference. In order to lock the rim in place there is provided a housing 5 having an opening adapted to receive a lock controlled closure 6. This housing has a depending jaw 7 for engaging one edge of the demountable rim to thereby lock it securely in place. The invention so far described is shown in Fig. 1 and constitutes no part of the present application but is shown and described to illustrate the double tire carrier assembly which will now be explained.

If it is desired to provide a double tire carrier of the ring type, the lock closure 6 and the housing 5 are removed and the hinged bracket 8 is riveted or otherwise secured to the main tire carrier 1. This hinge bracket comprises an angular flange 9 conforming to the circumference of the ring carrier. It is provided with a depending portion 10 terminating in a hook 11. It is also provided with a seat 30. An upper arm 12 is riveted to the supplemental ring carrier by the flange 13 which likewise conforms to the circumference of the suplemental ring carrier. This arm is provided with a recessed portion 14 and a shoulder 15 as clearly shown.

The assembly also includes the element 16 which constitutes a bracket and a housing for the bolt 17. This bolt housing and bracket are clearly shown in Fig. 3 and comprise a lug 18 engageable with the portion 19 of the rim clamp 2. It has depending walls 20, 21, and 22 to receive and support the locking bolt 17 aforesaid. 23 is a flange formed integrally with the bolt housing and bracket for the purpose of overreaching the lock housing 5. The rim clamp 2 is constructed to provide a stationary threaded element 24. I preferably provide a washer 25 to give additional friction to prevent the bolt from turning when applying and removing the lock housing.

The combined housing and bracket 16 aforesaid is provided with a depending rim engaging portion 26 adapted to engage one side of the main and auxiliary rims being carried. To this end, it has formed therein recesses 27 to receive the sides of the demountable rims. 28 indicates transverse walls of the bracket and housing. When it is desired to attach the auxiliary ring to the main carrier, it is necessary only to cause the extremity of the upper arm 12 and the pintle 29 carried thereby to be slipped into engagement with the hinge bracket 10 so that the pintle 29 seats within the hooked portion 1 and the shoulder 15 of the arm engages the seat 30 of hinged bracket. Thereafter, the combined bracket and housing 16 having the integral rim engaging extension 26 is applied to the rim clamp as shown and the locking bolt 17 tightened to correctly align the auxiliary rim carrier with the main rim carrier. The rigid head 31 of the bolt 17 is internally screw threaded to receive the threaded bolt 32 for the purpose of securing the lock housing 5 in position where its depending jaw 33 engages one side of the supported rim. It will be obvious that a rotation of the bolt 17 will cause the bracket 16 to be shifted laterally into tight engagement with the rim and that a subsequent turning effort of the bolt 32 will shift the lock housing having the rim engaging jaw 33 into engagement with the adjacent side of the supplemental rim.

It will be apparent that when it is necessary to remove the rear or supplemental spare tire, the first spare tire and rim are held rigidly in position. It is also possible to securely lock one spare tire only in either position. The housing arrangement afforded by the bracket 16 and the lock housing 5 prevents surreptitious removal of either spare tire by means of a single lock controlled closure.

Fig. 10 illustrates a variant form of structure including a lock band assembly. In this form of invention, the reference numeral 34 illustrates a band preferably made of metal and secured at one end to the interior of the lock housing by means of the bolt 35. The lock housing is preferably provided with a lip 36 to which the band is also riveted as at 37. This band may be hinged intermediate its ends, and one of its opposite ends is detachably secured to the transverse web 39. It will be apparent that this structure enables the use of the band lock if the tire carrier is converted from a single carrier to a double carrier in the manner above described. In this form of the invention, the clamp 2 is apertured as at 41 so that when the clamp 2 is used in a single carrier assembly, one end of the band lock may be quickly secured to the clamp 2. In order to permit this interchangeable use of the band lock with either the double or single type of carrier, the modified form differs from the preferred form merely by the addition of the member 36 and a slightly larger transverse web 39 and the formation of an aperture 41.

What I claim is:

1. A double tire carrier for automobiles comprising an assembly including a hinge bracket secured to one of the tire carriers, an arm rigidly secured to the other of the tire carriers, and means for detachably securing the arm to the hinge bracket, means for locking said carriers together, said means including a bracket formed to constitute a housing, a lock bolt within said bracket for attaching one of the carriers to the other, and means for preventing surreptitious access to said lock bolt.

2. A double tire carrier for automobiles comprising a hinge bracket secured to one of the carriers, an arm secured to the other of the carriers, detachable means for connecting the arm to the bracket to support the supplemental rim of the carrier, a bracket housing separating the carriers from one another at one point, a locking device confined within the housing for maintaining the bracket in operative position, and a lock controlled housing preventing unauthorized access to said locking device.

3. A double tire carrier for automobiles comprising a hinge bracket provided with a hook portion, said hinge bracket being secured to a main tire carrier, an arm secured to a supplemental carrier and provided with a recess therein, and a pintle for receiving and engaging the hooked portion of the bracket, to thereby secure the supplemental carrier to the main carrier, and means for locking the rims supported on said carriers against unauthorized removal.

4. A double tire carrier assembly for automobiles including two supporting rings for receiving and supporting demountable rims and tires thereon, means for detachably securing said ring carriers together, including a hinge bracket secured to one of the ring carriers, and an arm secured to the other of said ring carriers, means for locking the rims on the carriers, including a bracket taking the form of a housing and provided with a rim engaging portion, a bolt located within the confines of said bracket to secure the bracket in position.

5. A double tire carrier for automobiles comprising two rings adapted to receive and support spare tires thereon, a hinge bracket attached to one of the said rings and provided with a depending lug at one point and a hook portion at another point, an upper arm secured to the supplemental ring carrier provided with a recess having a pintle therein engageable with the said hook, said upper arm having a seat at its extremity engageable with the lug on the bracket to prevent downward movement of the supplemental carrier with respect to the main carrier, and means for securing said rings together at another point.

6. A locking device for double tire carriers comprising a housing provided with a downwardly disposed extension receiving one edge of each of the rims supported, a clamping rod within said housing, and a single means for preventing unauthorized access to said clamping rod and rim clamps engaging the opposite edges of both of the supported rims.

7. A locking device for double spare carriers for automobiles comprising a bracket taking the form of a housing, said bracket having an extension constituting rim engaging portions for engaging one side of each of the rims carried, means for engaging the outside edges of the supported rims, a stationary screw-threaded element secured by one of the carriers, and a locking bolt operable within the confines of the housing to engage said screw-threaded element whereby to maintain the bracket in position, and a lock controlled element preventing unauthorized access to said bolt.

8. A tire carrier of the ring type adapted to receive and support a demountable rim, means for securing said carrier to a vehicle, a supplemental ring type tire carrier adapted to be secured to the main carrier by a pivotal detachable connection when the supplemental carrier is in an inclined position with respect to the main carrier, means for spacing the ring carriers apart and maintaining them in alignment.

9. A tire carrier for automobiles adapted to be supported by a motor vehicle, means for detachably securing a supplemental tire carrier to said first mentioned tire carrier, the said means including an arm and bracket, respectively, secured to said carriers and having a pivotal connection about a horizontal axis, said arm and bracket being adapted to be connected when the supplemental rim is in a slightly tilted position and permitting a subsequent swinging movement of the supplemental carrier to cause it to be vertically aligned with respect to the main tire carrier, and means for locking said carriers in their spaced apart relationship at another point in the circumference thereof.

10. A tire carrier for automobiles adapted to be supported by a motor vehicle, means for quickly attaching a supplemental carrier to said first mentioned carrier, said means including a detachable pivotal connection between the carriers permitting swinging movement of the supplemental carrier to effect attachability and detachability, means for locking the carriers together including a detachable bracket secured to the lower portions of the carriers.

11. A tire carrier for automobiles adapted to be supported by a motor vehicle, means for pivotally connecting an auxiliary tire carrier to the first named carrier, at the upper ends thereof, means for locking the carriers together in their correct aligned position, said means including a detachable bracket shaped to form a housing and engaging the edges of the rims supported on the carrier, a bolt positioned within the housing of the bracket for clamping the carriers together, and a lock controlled closure preventing unauthorized access to said bolt.

12. In combination, a main tire carrier, a supplemental tire carrier, said carriers having a detachable pivotal connection at the upper ends thereof affording means for ready attachability at said upper portions of the carriers and means cooperating with the lower portion of the carriers to space and maintain them in correct aligned position.

13. In combination, a main tire carrier adapted for attachment to a vehicle, a supplemental carrier, a detachable pivotal connection at the upper portions of said carriers, affording means for ready attachability of the supplemental carrier to the main carrier at the upper portions thereof, and means for spacing and clamping said carriers and their supported tires at the lower point of their circumference, said means comprising a housing constituting a bracket engaging said carriers and a bolt within said housing for securing the bracket in its operative position to maintain the supplemental tire carrier in correct disposition with respect to the main carrier.

14. A detachable bracket for double tire carriers including a main stationary carrier and a supplemental attachable carrier, said bracket formed to constitute a housing, a locking bolt within the housing attachable to the main carrier to clamp it into position, said bracket having a downwardly disposed extension constituting rim seats engageable with one side of each of the rims supported by the main and supplemental carrier, rim clamps engaging the outer edges of the supported rims, and a single means for preventing unauthorized access to said locking bolt.

15. A locking device for double tire carriers comprising a housing provided with an extension receiving the adjacent edges of the rims supported, means at each end of said housing adapted to engage the remote edges of said rims, a clamping device within said housing and adapted to connect said housing and said rim engaging means together, and a single means for preventing unauthorized access to said clamping device.

In testimony whereof I affix my signature.

FREDERICK ARTHUR SMITH.